June 8, 1965   P. R. BUNNELLE   3,187,510
SPEED CONTROL MECHANISM FOR VARIABLE SPEED PUMPING UNITS
Filed May 11, 1961
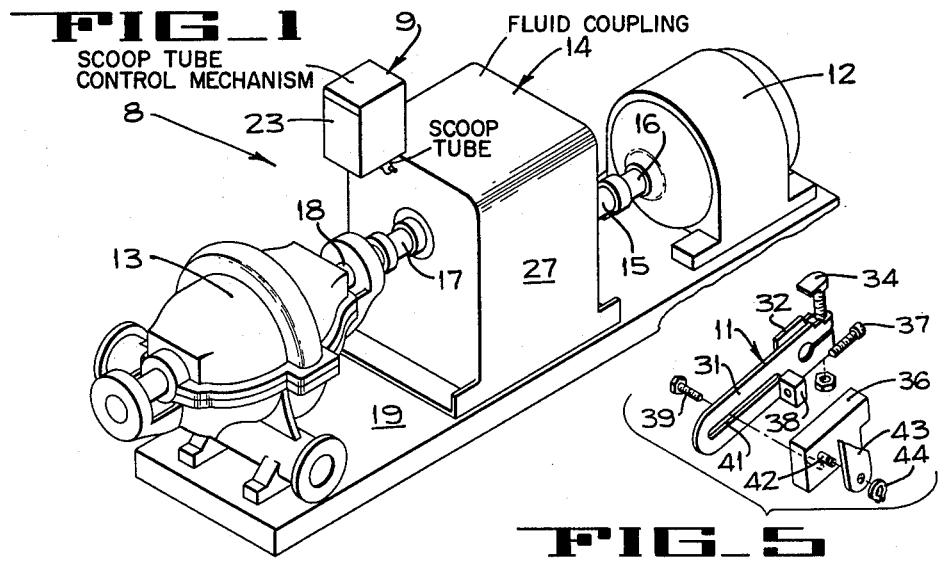
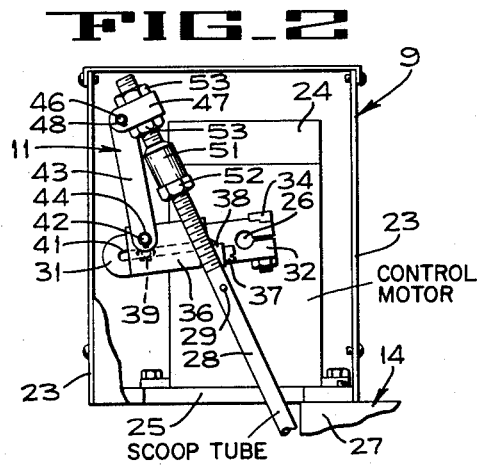
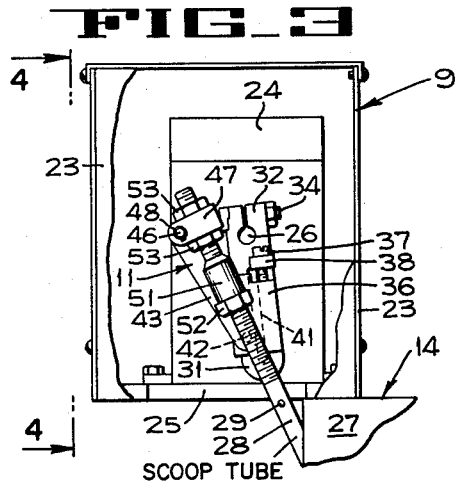
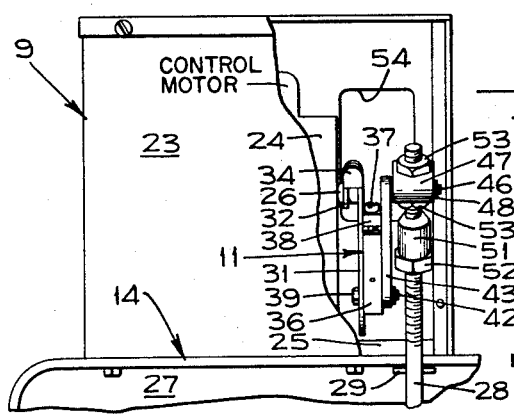
INVENTOR
PHILIP R. BUNNELLE
BY Hans F. Hoffmeister
ATTORNEY

United States Patent Office 3,187,510
Patented June 8, 1965

3,187,510
SPEED CONTROL MECHANISM FOR VARIABLE
SPEED PUMPING UNITS
Philip R. Bunnelle, San Jose, Calif., assignor to FMC
Corporation, a corporation of Delaware
Filed May 11, 1961, Ser. No. 109,426
2 Claims. (Cl. 60—54)

The preesnt invention appertains to variable speed pumping units and more particularly relates to an improved speed control mechanism which may be readily adjusted to vary the speed range of a variable speed pump so as to control the maximum and minimum speed of the pump.

Variable speed pumping units are well known and have been used for some time to eliminate the use of water supply tanks or pneumatic pressure tanks for supplying water to multi-story buildings in accordance with predetermined pressure-volume requirements. The variable speed fluid drive couplings of these units automatically maintain a water supply in the distribution system of the building at a constant pressure and permit a variable discharge rate so as to handle all normal water requirements. To accomplish this, the fluid drive coupling regulates the pump speed in accordance with the pressure in the system. This pressure is determined by one or more pressure regulators that send a signal to a control motor which is effective to vary the output speed of the fluid coupling, and thus the speed of the pump, so as to maintain the pressure at the proper level. If the pressure in the system is high, the control motor causes the fluid coupling to reduce the speed of the pump. Conversely, if the pressure in the system is low, the control motor is effective to increase the pump speed.

The above type of pumping unit is well known and has many advantages over systems which use water supply tanks or pneumatic pressure tanks. Heretofore, one difficulty with variable speed pumping units has been that it has been difficult to accurately set the desired operating pressure and maintain the desired speed range of these units in accordance with the water supply requirements. The linkages of the speed control mechanism, which extend between the control motor and the variable speed fluid drive of the prior art units, are difficult to adjust and required a skilled mechanic to perform the necessary adjustments.

It is, therefore, one object of the present invention to provide an improved linkage between a control motor and a variable speed fluid drive coupling to control the speed of the output shaft of the coupling.

Another object is to provide a speed control mechanism which includes a linkage which may be preassembled and adjusted at the factory.

Another object is to provide a control mechanism having a linkage arranged to move a scoop tube faster at high speed positions than at low speed positions.

Another object is to provide an improved speed control linkage which may be readily adjusted to change the low speed setting of the pump without materially affecting the high speed setting of the pump.

Another object is to provide an improved linkage which may be easily adjusted by an unskilled operator to vary the speed of the pump while the pumping unit is in operation.

These and other objects and advantages of the present invention will becomes apparent from the following description and the accompanying drawings, in which:

FIG. 1 is a perspective of a pumping unit in which the improved control mechanism and linkage of the present invention is employed.

FIG. 2 is an enlarged side elevation showing the linkage of the present invention in a high coupling speed position and disposed in a control mechanism housing having one wall broken away.

FIG. 3 is a side elevation similar to FIG. 2 but showing the linkage in a low coupling speed position.

FIG. 4 is a front elevation of the linkage, looking in the direction of arrows 4—4 of FIG. 3, said linkage being shown in a low coupling speed position with a wall of the control mechanism housing broken away.

FIG. 5 is an enlarged exploded perspective of a portion of the linkage.

The pumping unit 8 (FIG. 1) with which the control mechanism 9 and control linkage 11 of the present invention are employed, comprises a motor 12, a centrifugal pump 13, and a variable speed fluid drive coupling 14 which has its input shaft 15 connected to the drive shaft 16 of the motor 12 and its output shaft 17 connected to the shaft 18 of the pump 13. The motor 12, fluid drive coupling 14, and pump 13 are bolted to a common base 19 to provide a compact pumping unit.

The control mechanism 9 (FIGS. 2, 3, and 4) includes a housing 23, a control motor 24 bolted to the base 25 of the housing, and the linkage 11 which is clamped at one end on the shaft 26 of the control motor 24. The control mechanism 9 is bolted as an assembled and adjusted unit to the housing 27 of the variable speed fluid drive coupling 14, and the other end of the linkage 11 is readily connected to a portion of a scoop tube 28 that extends out the coupling 14. A pin 29 extends through the scoop tube 28 and is arranged to contact the housing 27 of the drive coupling 14 to limit the downward movement of the tube 28 when the tube 28 is not connected to the linkage 11. The function of the scoop tube is well known in the art and therefore the relationship of the tube with other parts of the drive coupling will not be described in detail. Movement of the scoop tube 28 upwardly and outwardly to the position shown in FIG. 2 places the variable speed fluid drive coupling 14 in the high coupling speed position while movement of the scoop tube 28 downwardly to the position shown in FIG. 3 places the coupling 14 in the low coupling speed position.

The improved linkage 11 comprises an arm 31 (FIGS. 2 and 5) which is clamped on the shaft 26 of the control motor 24 by a split hub 32 and a cooperating bolt 34. A pivot pin block 36 is adjustably connected to the arm 31 by an adjustment screw 37 which is threaded into the block 36 and extends through an opening in an ear 38 which is secured to and projects outwardly from the arm 31. A cap screw 39 (FIGS. 4 and 5) which extends through a longitudinally extending slot 41 in the arm 31 is screwed into a threaded hole in the block 36 to lock the same in the desired operating position after adjustments have been made.

A pivot pin 42 secured in the pivot pin block 36 has an end portion projecting outwardly therefrom upon which one end of a link 43 is pivotally connected. The link 43 is held from axial displacement from the pin by a snap ring 44. A pin 46 is secured to the other end of the link 43 and is pivotally received in and extends through an apertured block 47, and is held in place by snap rings 48. Since the scoop tube 28 of the well known fluid drive coupling 14 is not long enough for connecting the linkage 11 of the present invention thereto, a tube extension 51 is screwed on the upper end thereof and is locked in place by a lock nut 52. The apertured block 47 is slidably received on the extension 51 and is locked in the desired position by lock nuts 53.

The control motor 24 is capable of oscillating the shaft 26 at a constant speed through 90° between the low coupling speed position of FIG. 3 to the high coupling speed position of FIG. 2 in response to pressure changes in water being pumped. If the pressure is higher than normal, the shaft 26 will turn counterclockwise (FIGS. 2 and 3) until the pressure returns to normal, at which time the shaft 26 will be stopped to maintain this setting until the pressure is again above or below normal. Similarly, if the pressure is lower than normal the shaft 26 will turn clockwise. As shown in FIG. 4, one wall of the housing 23 is provided with an opening 54 through which tools may be inserted to adjust the linkage 11 without requiring that the housing 23 be disassembled to make such adjustments.

In the operation of the control mechanism 9 and linkage 11 of the present invention, the arm 31 is clamped onto the shaft 26 in such a way that the link 43 and arm 31 are substantially perpendicular when in the high coupling speed position shown in FIG. 2, and that the axis of the pivot pin 42 intersects or passes very close to the axis of the scoop tube 28 when in the low coupling speed position of FIG. 3.

The linkage 11 is initially connected to the scoop tube 28 in such a way that the full 90° range of movement of the shaft 26 may take place without mechanical interference between the pin 29 and the housing 27 when the parts are in the low coupling speed position and without causing excessive outward movement of the tube 28 when the parts are in the high coupling speed position. Accordingly, the pivot pin block 36 should first be moved to its outermost position relative to the shaft 26. The block 47 should then be locked on the extension 51 by the locknuts 53, with the pin 29 of the tube clearing the housing 27 by a small amount. The length of the link 43 and the distance between the shaft 26 and pin 42 is such that the linkage 11 will move the scoop tube 28 through its full stroke, upon movement of the shaft 26 through 90°, and accordingly, will determine the high coupling speed setting of the scoop tube 28. After the high coupling speed position has been set, the range and low coupling speed position of the scoop tube 28 is set by proper manipulation of the single adjustment screw 37 which moves the pivot pin block 36 toward the shaft 26. The block is locked in the desired low coupling speed position by the cap screw 39.

It will be noted that when the parts are in the high coupling speed position of FIG. 2, movement of the pivot pin block 36 toward or away from the shaft 26 will cause very little movement of the scoop tube 28. However, when the linkage 11 is in the low coupling speed position, movement of the pivot pin block 36 toward or away from the shaft 26 has a considerable effect on the position of the scoop tube 28. Thus, it is apparent that adjustment of the pivot pin block 36 will have little effect in changing the high speed of the pump 13 but will have a considerable effect in changing the low speed of the pump. It is apparent that the low speed of the pump must be accurately controlled so that the desired pressure will be maintained in the system at minimum flow rates. A pressure gauge (not shown) on the control mechanism 9 will aid the operator in making the desired adjustment.

The above linkage settings have been described as being performed after the control mechanism 9 has been assembled on the pumping unit 8. It is to be understood, however, that the control mechanism 9 can be preset at the factory in accordance with the desired pressure and flow rates indicated by the customer, and that the customer can then easily connect the control mehanism 9 to the variable speed fluid drive coupling and to the appropriate electrical power source. In this case, the customer will be advised of the proper distance between the block 47 and pin 29.

When wear on the pump occurs, the resulting capacity and pressure losses can be easily compensated for by adjustment of the screw 37 so as to increase the low speed of the pump.

It is well known that the scoop tubes of variable speed fluid drive couplings must move considerably farther to produce a given change at high discharge rates of the accompanying pump than at low discharge rates. Accordingly, the linkage of the present invention is arranged to move the scoop tube faster at the higher speed positions than at the lower speed positions in response to actuation of the constant speed control motor 24.

From the foregoing description it is apparent that the improved control mechanism and linkage of the present invention may be easily adjusted by an unskilled person to provide and maintain the desired water pressure and flow rate from a variable speed pump. The linkage is designed to be readily adjusted to permit major variations in the slow speed of the pump while having little effect on the high speed of the pump. The linkage is also arranged to move the scoop tube slowly at the low coupling speed positions and fast at the high coupling speed positions.

While one embodiment of the present invention has been shown and described, it will be understood that various changes and modifications may be made without departing from the spirit of the invention or the scope of the appended claims.

Having thus described the present invention and the manner in which the same is to be used, what is claimed as new and desired to be protected by Letters Patent is:

1. In a variable speed fluid drive coupling including a support and a scoop tube movable relative to the support along a substantially rectilinear path between a high coupling speed position projected out from the support and a low coupling speed position retracted inwardly relative to said high coupling speed position, a mechanism for controlling the movement of said tube comprising a shaft journalled in said support and having an axis of rotation disposed transversely of and laterally spaced from said path, said path lying in a predetermined reference plane substantially parallel to the axis of said shaft, an arm secured to and projecting radially from said shaft, pivot means mounted on said arm for movement therealong toward and away from said shaft, said pivot means providing a first pivot axis substantially parallel to said shaft axis, means for moving said shaft in opposite directions about its axis between a position corresponding to the low coupling speed position with said first pivot axis substantially in said reference plane and a position corresponding to the high coupling speed position with said arm projecting crosswise of said path and with said first pivot axis lying on the opposite side of said reference plane from said shaft, and a rigid member pivotally connected to said pivot means for relative pivotal movement about said first pivot axis and pivotally connected to said tube on a second pivot axis substantially parallel to said first pivot axis and spaced from said first pivot axis lengthwise of said path in said low coupling speed position of the arm whereby said tube is moved between its high coupling speed and low coupling speed positions respectively upon movement of the arm between the arm's high and low coupling speed positions.

2. In a variable speed fluid drive coupling having a scoop tube movable in a linear path between a high coupling speed position and a low coupling speed position, a speed control mechanism comprising an output shaft mounted for oscillation, a constant speed motor drivingly connected to said output shaft and selectively operable to oscillate said shaft within a range of approximately 90° between a first position corresponding to the low coupling speed position and a second position corresponding to the high coupling speed position, an arm secured to said shaft and extending radially therefrom, a pivot block connected to said arm, means for adjusting said pivot block radially of said shaft, a pivot pin projecting from said pivot block, and a link pivotally connected at one end thereof to said pivot pin and pivotally connected at the other end thereof to said scoop tube, said pivot pin having an axis which intersects the linear path of the scoop tube when the tube is in its low coupling speed position and said arm is in its first position and which pin axis is spaced a substantial distance from the path of the scoop tube when said scoop tube is in its high coupling speed position and said arm is in its second position, oscillation of said shaft through said range causing the rate of linear movement of the scoop tube to progressively increase as said arm moves from said first position to said second position and wherein the rate of linear movement of the scoop tube progressively decreases as said arm moves from said second position to said first position.

References Cited by the Examiner

UNITED STATES PATENTS

| | | | |
|---|---|---|---|
| 1,855,032 | 4/32 | Sinclair. | |
| 2,425,885 | 8/47 | Jennings | 230—11 |
| 2,436,034 | 2/48 | Buehler | 60—54 X |
| 2,491,482 | 12/49 | Dolza et al. | 230—11 X |
| 2,491,483 | 12/49 | Dolza et al. | 60—54 |
| 2,841,959 | 7/58 | Snow | 60—54 |
| 2,957,312 | 10/60 | Sinclair | 60—54 |

JULIUS E. WEST, *Primary Examiner.*

LAURENCE V. EFNER, *Examiner.*